US012678820B2

(12) United States Patent
Iwaki et al.

(10) Patent No.: US 12,678,820 B2
(45) Date of Patent: Jul. 14, 2026

(54) COATING DEVICE

(71) Applicant: KANEKA CORPORATION, Osaka (JP)

(72) Inventors: Kazuo Iwaki, Settsu (JP); Tatsuyuki Maeda, Settsu (JP)

(73) Assignee: KANEKA CORPORATION, Osaka (JP)

( * ) Notice: Subject to any disclaimer, the term of this patent is extended or adjusted under 35 U.S.C. 154(b) by 461 days.

(21) Appl. No.: 18/279,658

(22) PCT Filed: Feb. 18, 2022

(86) PCT No.: PCT/JP2022/006664
§ 371 (c)(1),
(2) Date: Aug. 31, 2023

(87) PCT Pub. No.: WO2022/202014
PCT Pub. Date: Sep. 29, 2022

(65) Prior Publication Data

US 2024/0131556 A1 Apr. 25, 2024
US 2024/0226956 A9 Jul. 11, 2024

(30) Foreign Application Priority Data

Mar. 25, 2021 (JP) ................................ 2021-051391

(51) Int. Cl.
*B05C 13/02* (2006.01)
*B05C 5/02* (2006.01)

(52) U.S. Cl.
CPC ................ *B05C 13/02* (2013.01); *B05C 5/02* (2013.01)

(58) Field of Classification Search
CPC ......... B05C 5/02; B05C 13/02; B05C 13/025; B05C 5/0241; A61M 25/10; A61M 2025/105; A61M 25/1029; A61M 25/00
See application file for complete search history.

(56) References Cited

U.S. PATENT DOCUMENTS

2014/0121597 A1 5/2014 Chappa et al.
2014/0161964 A1 6/2014 Chappa et al.

FOREIGN PATENT DOCUMENTS

JP 2015-119801 A 7/2015
JP 2015-119802 A 7/2015
JP 2016-504058 A 2/2016
JP 2018-153283 A 10/2018

OTHER PUBLICATIONS

Machine translation of JP 2015119802 A (Year: 2015).*
International Search Report (PCT/ISA/210) issued in PCT/JP2022/006684, dated Apr. 5, 2022.

* cited by examiner

*Primary Examiner* — Vishal I Patel
(74) *Attorney, Agent, or Firm* — Birch, Stewart, Kolasch & Birch, LLP

(57) ABSTRACT

A coating device as a device for coating a long member (40) for medical use, the coating device comprising: a support part (2) capable of supporting the long member (40); and a discharge port (15) which is provided in the support part (2) or disposed at a higher location than the support part (2) and from which liquid to be applied to the long member (40) is discharged.

19 Claims, 8 Drawing Sheets

[Fig. 1]
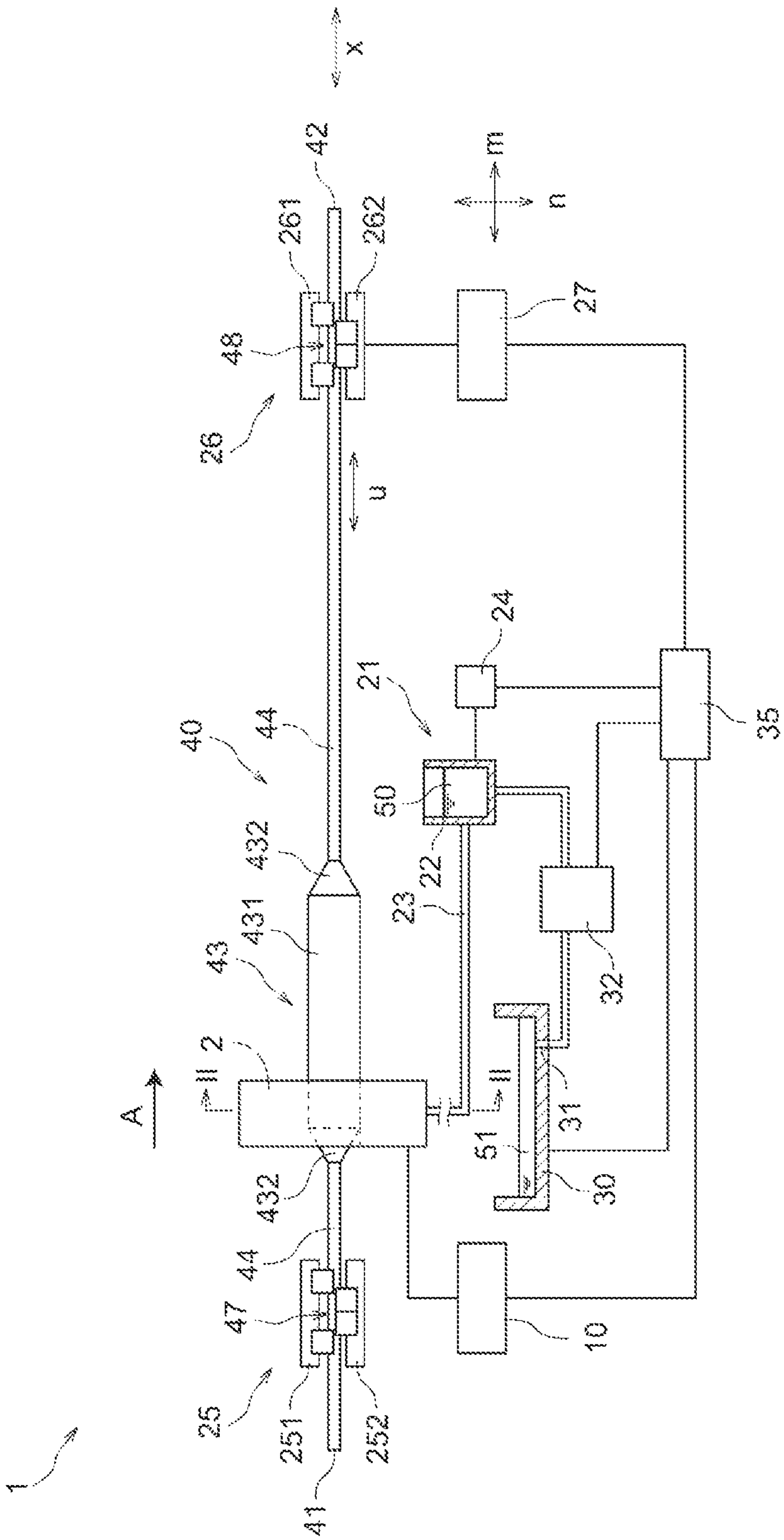

[Fig. 2]
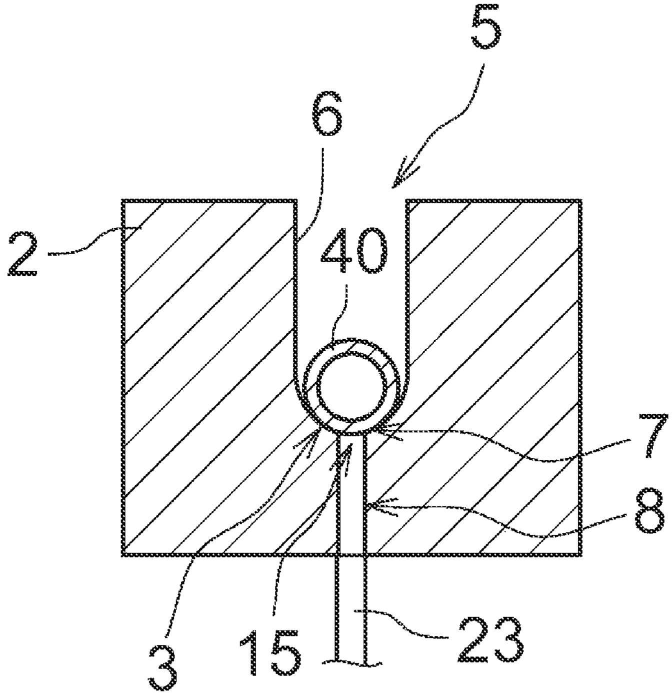
[Fig. 3]
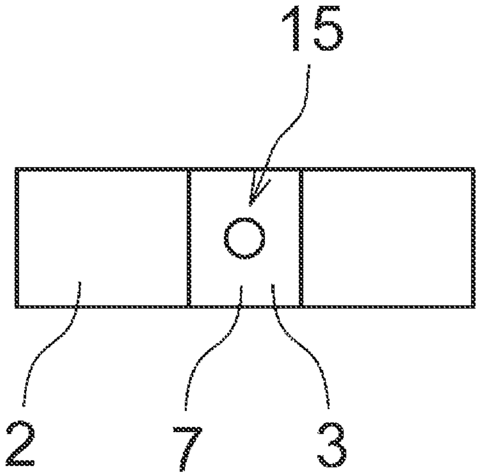

[Fig. 4]
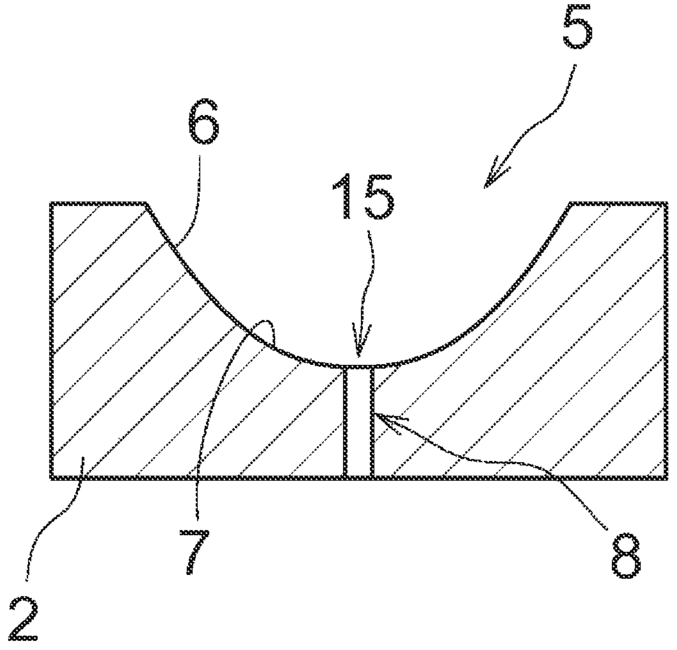

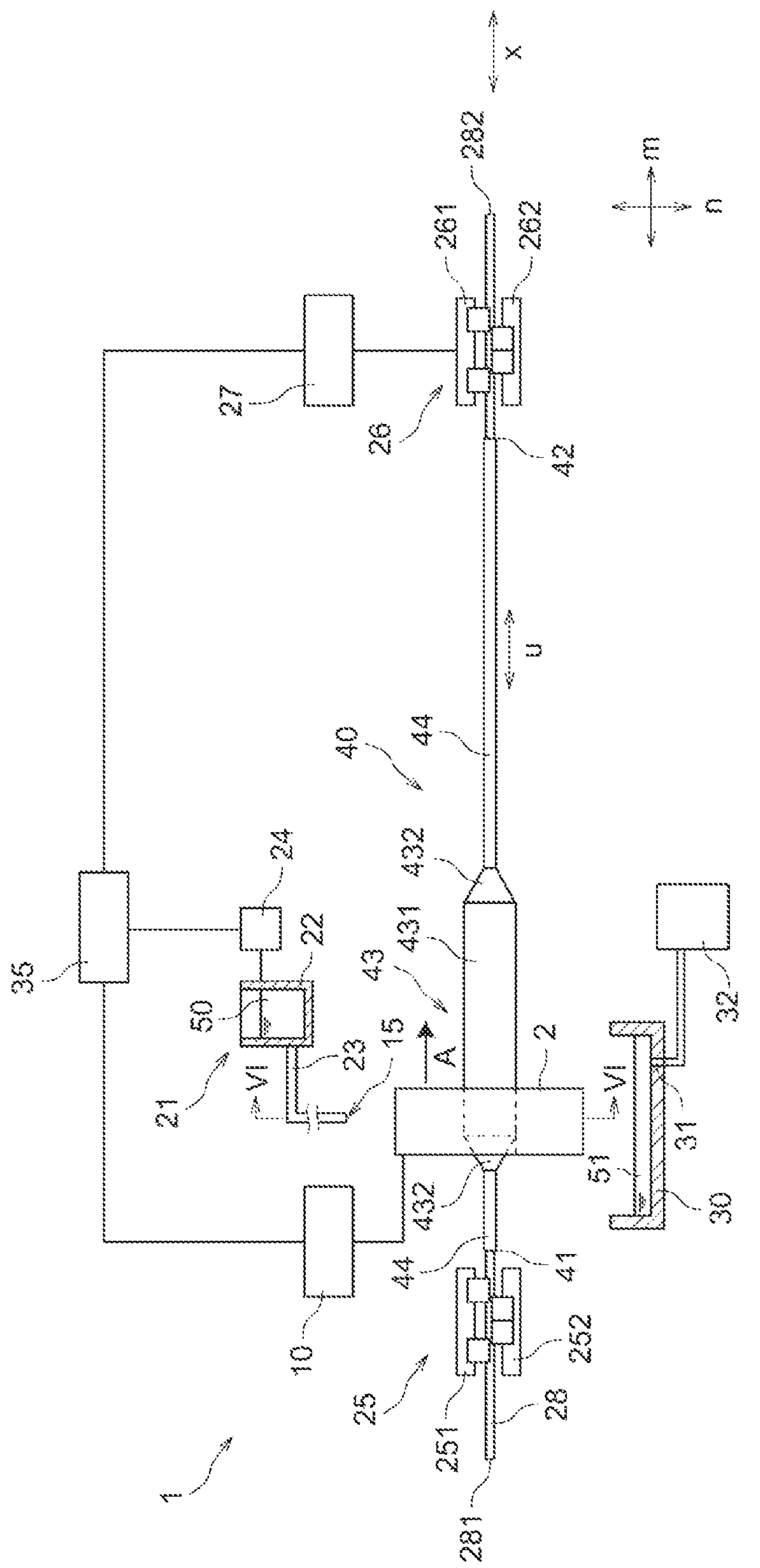
[Fig. 5]

[Fig. 6]
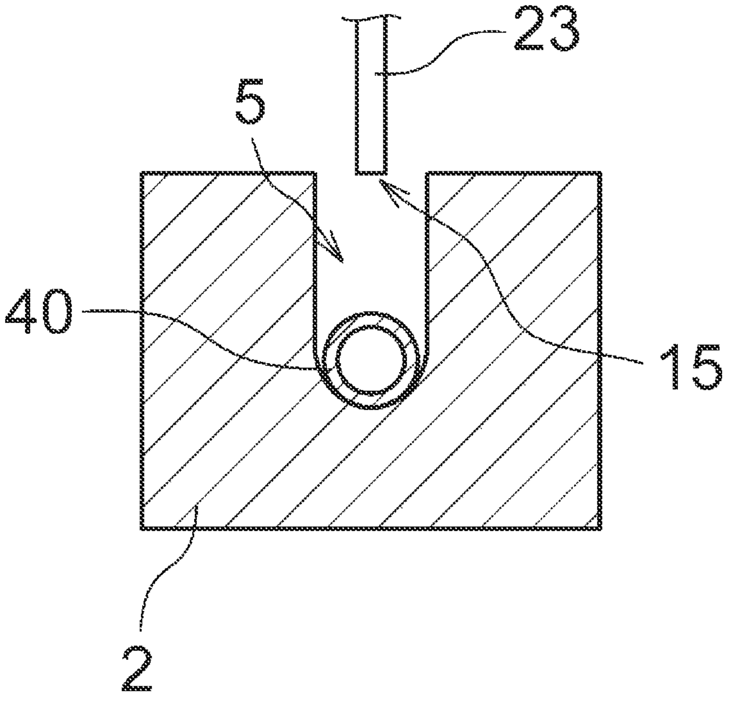
[Fig. 7]
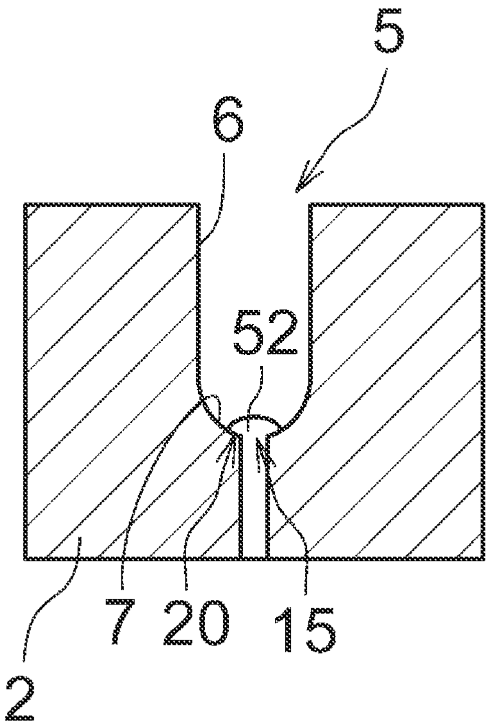

[Fig. 8]
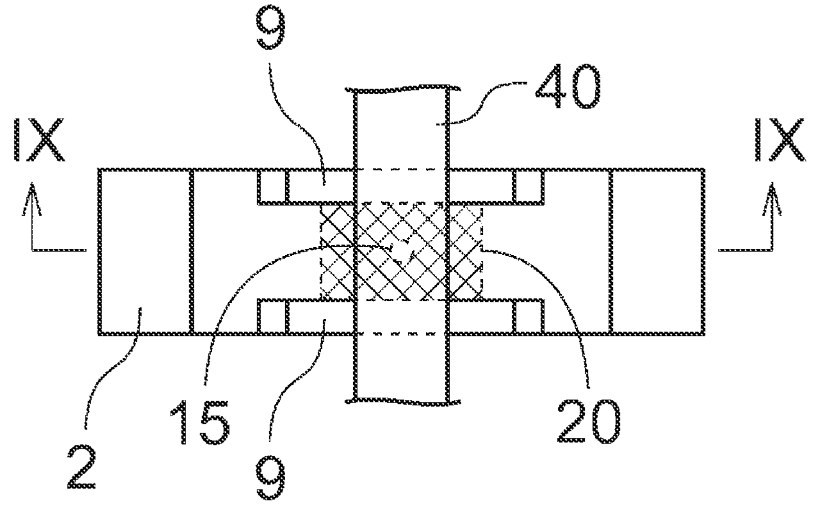
[Fig. 9]
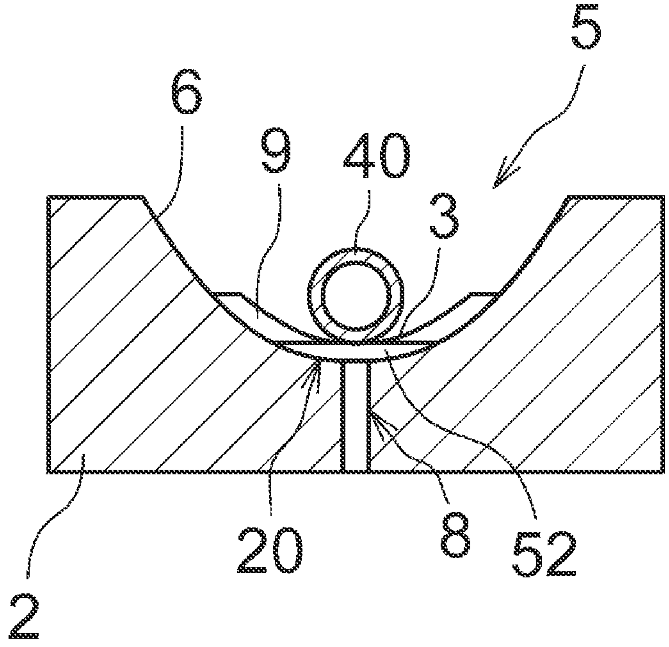

[Fig. 10]
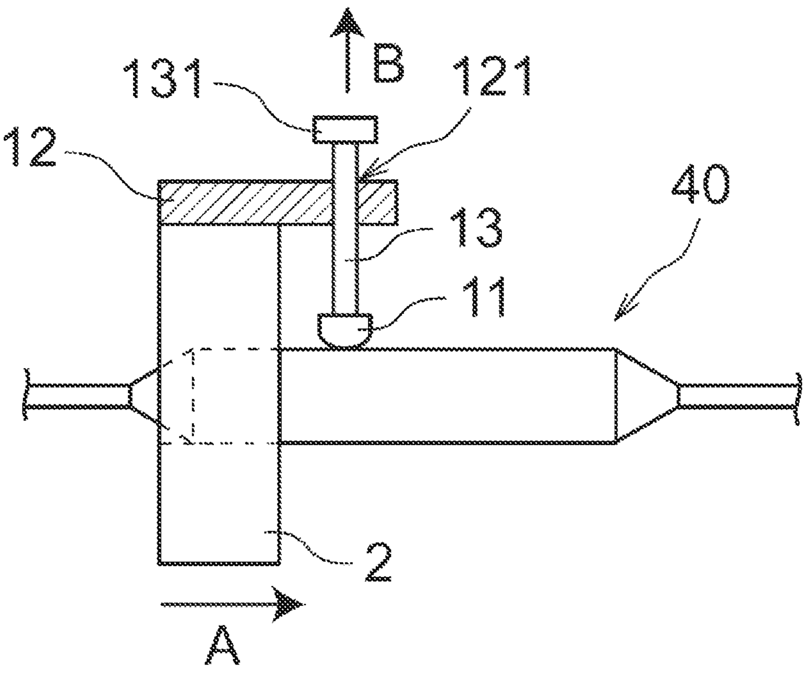
[Fig. 11]
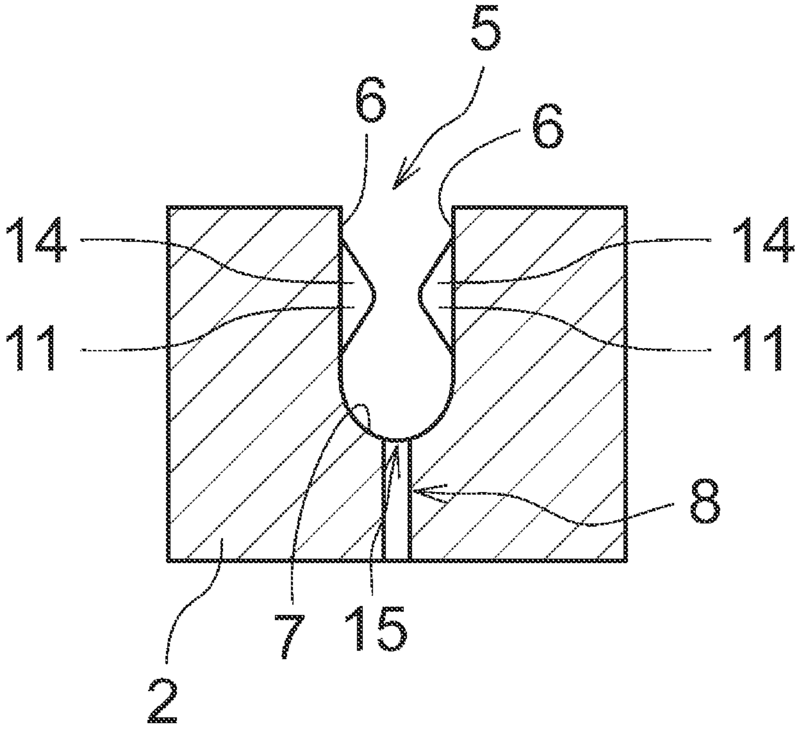

[Fig. 12]
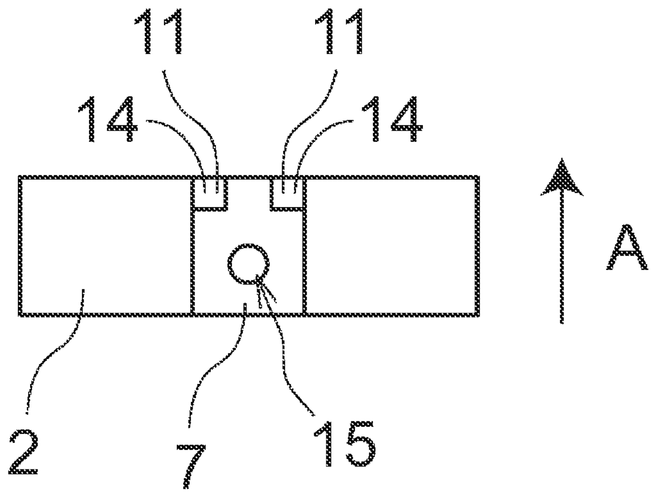

COATING DEVICE

TECHNICAL FIELD

The present invention relates to a device for coating a long member for medical use.

BACKGROUND ART

Coating is applied to a surface of a medical tool such as a catheter for the purpose of easy insertion into a biological lumen, surface protection and reinforcement of a medical tool, and the like.

As an example of a device used for coating, Patent Document 1 discloses that a device for coating a medical instrument includes a coating application unit, the coating application unit includes a contact fluid applicator including a continuous U-shaped surface for forming a U-shaped groove, the contact fluid applicator is configured to be in contact with a medical instrument in the U-shaped groove, and the contact fluid applicator includes a fluid orifice.

Patent Document 2 discloses that a balloon coating device includes a rotation mechanism that rotates a balloon about an axial center of the balloon, an application unit that moves relative to the balloon in an axial center direction of the balloon and applies coating liquid containing a chemical agent to an outer surface of the balloon, and a balloon support part that comes into contact with an outer surface of the balloon on a moving direction side of the application unit to support the balloon.

RELATED ART DOCUMENTS

Patent Documents

Patent Document 1: JP-A-2016-504058
Patent Document 2: JP-A-2015-119801

SUMMARY OF THE INVENTION

Technical Problem

From the viewpoint of improving quality of a coating film, it is beneficial to provide a novel coating device. In view of the above, an object of the present invention is to provide a coating device in which a coating film thickness is easily made uniform.

Solutions to the Problems

The gist of one embodiment of a device for coating a long member for medical use according to the present invention that can overcome the above problems is as follows. The coating device comprising: a support part capable of supporting the long member, and a discharge port which is provided in the support part or disposed at a higher location than the support part and from which liquid to be applied to the long member is discharged. In the coating device according to the present invention, since the discharge port is provided in the support part or disposed at a higher location than the support part, the support part and the discharge port can be brought close to each other. Since the long member can be supported near the discharge port, even if the long member moves during application of liquid, the movement can be restricted by the support part. As a result, variation in a coating film thickness is less likely to occur, and the coating film thickness is likely to be uniformed.

The support part may have a recess on an upper surface, and the discharge port may be provided on a surface of the recess. The discharge port may be provided at a position including a lowermost point of an inner bottom surface of the recess. The liquid may be discharged upward from the discharge port.

The support part may have a liquid pool part which is disposed around the discharge port and in which the liquid discharged from the discharge port is accumulated.

The coating device may further include a pressing part that presses the long member from above. The support part may be movable in a longitudinal axis direction of the long member, and the pressing part may be disposed further on a side to which the support part advances than the discharge port in the longitudinal axis direction. The pressing part may be movable in a vertical direction. The support part may be movable in the longitudinal axis direction of the long member, the coating device further comprising: an attachment part that is connected to the support part, extends toward the side to which the support part advances, and attaches the pressing part to the support part. The coating device may further include a shaft extending in the vertical direction, and the pressing part may be disposed at a lower end portion of the shaft. In a case where the coating device may further include the shaft extending in the vertical direction and the pressing part is disposed at a lower end portion of the shaft, the attachment part may have a through hole penetrating in the vertical direction and the shaft may be inserted into the through hole. The support part may have the recess on an upper surface, the pressing part may be a protrusion provided on the surface of the recess. The protrusion may protrude from the surface of the recess so as to extend in a horizontal direction or a normal direction of the surface of the recess.

The discharge port may be movable in the longitudinal axis direction of the long member. The discharge port may be movable in a radial direction of the long member. The discharge port may be movable together with the support part. A plurality of the support parts may be included, and the discharge port may be provided in each of the plurality of the support parts.

The coating device may have a first holding part that holds a first end side in the longitudinal axis direction of the long member and a second holding part that holds a second end side in the longitudinal axis direction of the long member, wherein at least one of the first holding part and the second holding part may have a rotation mechanism that rotates the long member. The long member may be a member for forming a catheter.

Advantageous Effects of the Invention

In the coating device according to the present invention, since the discharge port is provided in the support part or disposed at a higher location than the support part, the support part and the discharge port can be brought close to each other. Since the long member can be supported near the discharge port, even if the long member moves during application of liquid, the movement can be restricted by the support part. As a result, variation in a coating film thickness is less likely to occur, and the coating film thickness is likely to be uniformed.

BRIEF DESCRIPTION OF THE DRAWINGS

FIG. 1 is a schematic view of a coating device and a long member according to an embodiment of the present invention.

FIG. 2 is an end surface view (partial front view) of a cut portion taken along line II-II of the coating device and the long member illustrated in FIG. 1.

FIG. 3 is a plan view of a support part and a discharge port illustrated in FIG. 2 and illustrates a state in which the long member is not supported by the support part.

FIG. 4 is an end surface view of a cut portion illustrating a variation of the support part and the discharge port illustrated in FIG. 2 and illustrate a state where the long member is not supported by the support part.

FIG. 5 is a schematic view illustrating a variation of the coating device and the long member illustrated in FIG. 1.

FIG. 6 is an end surface view (partial front view) of a cut portion taken along line VI-VI of the coating device and the long member illustrated in FIG. 5.

FIG. 7 is an end surface view of a cut portion illustrating a variation of the support part and the discharge port illustrated in FIG. 2 and illustrate a state where the long member is not supported by the support part.

FIG. 8 is a plan view illustrating a variation of the support part and the discharge port illustrated in FIG. 3 and illustrates a state in which the long member is supported by the support part.

FIG. 9 is a cross-sectional view taken along line IX-IX of the support part, the discharge port, and the long member illustrated in FIG. 8.

FIG. 10 is a schematic view illustrating another variation of the support part and the discharge port illustrated in FIG. 2 and illustrates a state in which the long member is supported by the support part.

FIG. 11 is an end surface view of a cut portion illustrating a variation of the support part and the discharge port illustrated in FIG. 2 and illustrate a state where the long member is not supported by the support part.

FIG. 12 is a plan view of the support part and the discharge port illustrated in FIG. 11.

DESCRIPTION OF EMBODIMENTS

The present invention will be specifically explained below based on the following embodiments; however, the present invention is not restricted by the embodiments described below of course, and can be certainly put into practice after appropriate modifications within in a range meeting the gist of the above and the below, all of which are included in the technical scope of the present invention. In the drawings, hatching, a reference sign for a member may be omitted for convenience, and in such a case, the description and other drawings should be referred to. In addition, sizes of various members in the drawings may differ from the actual sizes thereof, since priority is given to understanding the features of the present invention.

An embodiment of a coating device according to the present invention is a device for coating a long member for medical use, and has the gist in including a support part capable of supporting the long member, and a discharge port which is provided in the support part or disposed at a higher location than the support part and from which liquid to be applied to the long member is discharged. In the coating device according to the present invention, since the discharge port is provided in the support part or disposed at a higher location than the support part, the support part and the discharge port can be brought close to each other. Since the long member can be supported near the discharge port, even if the long member moves during application of liquid, the movement can be restricted by the support part. As a result, variation in a coating film thickness is less likely to occur, and the coating film thickness is likely to be uniformed.

A coating method using the coating device according to the present invention is classified as a pre-measuring system in which a predetermined amount of liquid is applied to a long member, so that an optional coating film thickness can be obtained. Therefore, it is different from a post-measuring system such as dip coating. A configuration example of the coating device will be described with reference to FIGS. 1 to 12. FIG. 1 is a schematic view of the coating device and a long member according to an embodiment of the present invention. FIG. 2 is an end surface view (partial front view) of a cut portion taken along line II-II of the coating device and the long member illustrated in FIG. 1. FIG. 3 is a plan view of a support part and a discharge port illustrated in FIG. 2, and illustrates a state in which the long member is not supported by the support part. FIGS. 4, 7, and 11 are end surface views of a cut portion illustrating a variation of the support part and the discharge port illustrated in FIG. 2, and illustrate a state where the long member is not supported by the support part. FIG. 5 is a schematic view illustrating a variation of the coating device and the long member illustrated in FIG. 1. FIG. 6 is an end surface view (partial front view) of a cut portion taken along line VI-VI of the coating device and the long member illustrated in FIG. 5. FIG. 8 is a plan view illustrating a variation of the support part and the discharge port illustrated in FIG. 3, and illustrates a state in which the long member is supported by the support part. FIG. 9 is a cross-sectional view taken along line IX-IX of the support part, the discharge port, and the long member illustrated in FIG. 8. FIG. 10 is a schematic view illustrating another variation of the support part and the discharge port illustrated in FIG. 2, and illustrates a state in which the long member is supported by the support part. FIG. 12 is a plan view of the support part and the discharge port illustrated in FIG. 11. Note that, in FIG. 8, liquid discharged from the discharge port is omitted.

First, a long member 40 to be coated will be described. The long member 40 is not particularly limited as long as it is a member for forming a medical tool. Examples of the medical tool include those referred to as a catheter, a guide wire, a tube, a stent, a pipe, and a rod. Examples of the catheter include a balloon catheter, a cannula, a stent delivery catheter, and a microcatheter.

The long member 40 has a first end 41 and a second end 42 in a longitudinal axis direction u. An outer diameter of the long member 40 may be constant entirely in the longitudinal axis direction u, or may be different depending on a position in the longitudinal axis direction u. For example, as illustrated in FIG. 1, the long member 40 may have a large diameter portion 43 and a small diameter portion 44. Since the long member 40 for balloon catheter formation is illustrated in FIG. 1, the large diameter portion 43 has a straight pipe portion 431 and tapered portions 432 on both sides of the straight pipe portion 431.

The long member 40 may have a tubular shape with one or more lumens. Further, the long member 40 may have a solid shape. The long member 40 may have flexibility. Further, the long member 40 may have elasticity.

The long member 40 is preferably made from resin or metal. Examples of the resin constituting the long member 40 include polyamide-based resin, polyester-based resin, polyurethane-based resin, polyolefin-based resin, fluorine-based resin, vinyl chloride-based resin, silicone-based resin, and natural rubber. One kind of these may be used or two or more kinds of these may be used in combination. Examples of the metal constituting the long member 40 include stainless steel such as SUS304 or SUS316, platinum, nickel, cobalt, chromium, titanium, tungsten, gold, a Ni—Ti alloy, a Co—Cr alloy, or a combination of these.

A type of liquid applied to the long member 40, that is, coating liquid is not particularly limited, and for example, liquid obtained by diluting silicone resin, urethane resin, acrylic resin, fluororesin, or a mixture of these with a solvent can be used. The liquid may contain a chemical agent or an additive. A type of liquid can be selected in consideration of a function required for coating, for example, improvement in operability such as slidability of the long member 40, protection and reinforcement of the long member 40, ease of handling at the time of coating, and the like.

The liquid may be applied only to a part in the longitudinal axis direction u of the long member 40, or the liquid may be applied to the entire long member 40 in the longitudinal axis direction u.

A coating device 1 includes a support part 2 and a discharge port 15. The support part 2 is a part capable of supporting the long member 40. In other words, the support part 2 supports the long member 40 from the lower side in a vertical direction n. When at least a part of the long member 40 is placed on the support part 2, the placed part remains on the support part 2 without falling off the support part 2. Note that the present invention also includes an aspect in which the support part 2 is not always in contact with the long member 40, for example, an aspect in which the long member 40 is temporarily separated from the support part 2 by a centrifugal force when coating is applied while the long member 40 is rotated, so that the long member is not in contact with the support part 2.

The support part 2 can include one or a plurality of members. The support part 2 may have a block shape, a plate shape, a table shape, or the like. The support part 2 may have a support surface 3 with which the long member 40 comes into contact. The support surface 3 may be a flat surface or a curved surface. In a case where the support surface 3 is a flat surface, the support surface 3 may be parallel to a horizontal direction m or may be inclined with respect to the horizontal direction m. In a case where the support surface 3 is a curved surface, the support surface 3 may be curved or bent. In the support part 2, the long member 40 may be supported at a point or may be supported on a plane. The support surface 3 may have a shape conforming to an outer surface shape of the long member 40.

The support part 2 only needs to be configured to support at least a part in the longitudinal axis direction u of the long member 40, and does not need to support the entire long member 40 in the longitudinal axis direction u. For example, the support part 2 is preferably able to support a part between the first end 41 and the second end 42 of the long member 40. The support part 2 may support one position or a plurality of positions in the longitudinal axis direction u of the long member 40.

The support part 2 is preferably movable in the longitudinal axis direction u of the long member 40. A rail may be disposed above or below the support part 2, and the support part 2 may move along the rail. The support part 2 may be movable in a radial direction of the long member 40. The support part 2 may be movable in the horizontal direction m or may be movable in the vertical direction n. The support part may be movable in a circumferential direction of the long member 40. In a case where the coating device 1 has a plurality of the support parts 2, a plurality of the support parts 2 may be movable together or may be movable separately.

In order to move the support part 2, the support part 2 may have a drive mechanism 10. The drive mechanism 10 is connected to a control unit 35, and movement of the support part 2 is controlled by the control unit 35. The drive mechanism 10 preferably includes actuator with one or more axes that drive the support part 2. The actuator may include a mechanical element such as a motor, a linear guide, a ball screw, a timing belt pulley, a slider, a rack-and-pinion, and the like.

The coating device 1 only needs to have at least one of the support part 2, and may have a plurality of the support parts 2. One of the long member 40 may be supported by one of the support part 2, or one of the long member 40 may be supported by a plurality of the support parts 2. In a case where the coating device 1 has a plurality of the support parts 2, each of a plurality of the support parts 2 preferably supports each of the long members 40. A plurality of the support parts 2 is preferably arranged in a direction perpendicular to the longitudinal axis direction u of the long member 40. A plurality of the support parts 2 may be arranged in the horizontal direction m.

In FIGS. 2 to 3, the support part 2 has a recess 5 on its upper surface. A part of a surface 6 of the recess 5 functions as the support surface 3. The recess 5 has a depth direction, a length direction, and a width direction. The depth direction of the recess 5 is parallel to the vertical direction n. The length direction of the recess 5 is parallel to a direction of an axis x of the coating device 1. The width direction of the recess 5 is a direction perpendicular to the depth direction and the length direction, and is a left-right direction on FIG. 2. By disposing the long member 40 in the recess 5, the long member 40 can be supported by the recess 5. Specifically, the long member 40 is supported by an inner bottom surface 7 of the recess 5.

The surface 6 of the recess 5 only needs to be at least partially bent and formed in a recessed shape, and may be curved or bent. As illustrated in FIG. 2, the surface 6 of the recess 5 may be formed in a U shape. The surface 6 of the recess 5 may have a portion extending in the vertical direction n on both sides in the width direction of the recess 5. The portion extending in the vertical direction n can restrict movement of the long member 40 in the width direction of the recess 5. As illustrated in FIG. 4, the surface 6 of the recess 5 may have a portion extending from the inner side to the outer side in the width direction from the lower side to the upper side in the vertical direction n on both sides in the width direction of the surface 6 of the recess 5.

The support part 2 may have a plurality of the recesses 5. In this case, a plurality of the recesses 5 may be arranged in the longitudinal axis direction u of the long member 40. With this configuration, one of the long member 40 can be supported by a plurality of the recesses 5. Further, in a case where the support part 2 has the drive mechanism 10 and the support part 2 has a plurality of the recesses 5, a plurality of the recesses 5 can be simultaneously moved by one of the drive mechanism 10. A plurality of the recesses 5 may be arranged in the horizontal direction m, for example, in a direction perpendicular to the longitudinal axis direction u of the long member 40. With this configuration, each of a plurality of the long members 40 can be supported by each of the recesses 5.

A material constituting the support part 2 is not particularly limited, and the support part 2 can be made from metal or resin. As a material constituting the support part 2, description of a material constituting the long member 40 can be referred to.

The discharge port 15 is provided in the support part 2 or disposed at a higher location than the support part 2, and discharges liquid 50 to be applied to the long member 40. In the coating device 1, since the discharge port 15 is provided in the support part 2 or disposed at a higher location than the support part 2, the support part 2 and the discharge port 15 can be brought close to each other. Since the long member 40 can be supported near the discharge port 15, even if the long member 40 moves during application of liquid, the movement can be restricted by the support part 2. As a result, variation in a coating film thickness is less likely to occur, and the coating film thickness is likely to be uniformed.

The coating device 1 may have one of the discharge port 15 or a plurality of the discharge ports 15. In a case where the coating device 1 has a plurality of the support parts 2, the discharge port 15 is preferably arranged in each of a plurality of the support parts 2. With this configuration, a plurality of the long members 40 can be coated at the same time. Note that a plurality of the discharge ports 15 may be arranged for one of the support part 2. By using a plurality of the discharge ports 15, a plurality of portions of one of the long member 40 can be coated at the same time, so that coating time can be shortened.

A shape of the discharge port 15 is not particularly limited, and may be a circular shape, an oval shape, a polygonal shape, or a shape obtained by combining these shapes. The oval shape includes an elliptical shape, an egg shape, and a rounded rectangular shape.

Liquid may be discharged from the discharge port 15 in a liquid state or in an atomized state. The liquid can be discharged at a flow rate of, for example, 0.05 mL/min or more and 1 mL/min or less.

In FIGS. 1 to 3, the discharge port 15 is provided in the support part 2. Specifically, the support part 2 has the recess 5 on an upper surface, and the discharge port 15 is provided on the surface 6 of the recess 5. With this configuration, it is possible to discharge liquid to the long member 40 while restricting movement of the long member 40 by the support part 2.

The discharge port 15 may be provided at any position in the recess 5, but as illustrated in FIG. 2, the discharge port 15 is preferably provided at a position including a lowest point of the inner bottom surface 7 of the recess 5. Since the discharge port 15 is provided at a part where the long member 40 is likely to come into contact in the support part 2, liquid is likely to adhere to the long member 40.

As can be understood from FIG. 2, liquid is preferably discharged upward from the discharge port 15. With this configuration, an appropriate amount of liquid can be easily applied to the long member 40, and a coating film thickness can be easily made uniform.

As illustrated in FIGS. 5 to 6, the discharge port 15 may be disposed at a higher location than the support part 2. In this case, the discharge port 15 is preferably provided on the upper side in the vertical direction n of the support part 2, and the discharge port 15 is more preferably provided directly above the support part 2. In a case where the discharge port 15 is disposed at a higher location than the support part 2, liquid is preferably discharged downward from the discharge port 15.

As illustrated in FIGS. 7 to 9, the support part 2 may have a liquid pool part 20 which is disposed around the discharge port 15 and in which liquid discharged from the discharge port 15 is accumulated. When the long member 40 comes into contact with a liquid pool 52 in the liquid pool part 20, coating of the long member 40 can be easily performed.

As illustrated in FIG. 7, in the liquid pool part 20, liquid discharged from the discharge port 15 preferably has a droplet shape. The droplet may have, for example, a hemispherical shape.

As illustrated in FIGS. 8 to 9, a projection 9 may be disposed on the surface 6 of the recess 5 of the support part 2 at both end sides of the recess 5 in a length direction of the recess 5 rather than the discharge port 15. A portion sandwiched between two of the projections 9, that is, a portion lower than two of the projections 9 may be the liquid pool part 20. In FIG. 8, the liquid pool part 20 is indicated by intersecting hatching. The projection 9 functions as a wall for forming the liquid pool 52 on the support part 2. By forming the liquid pool part 20 by providing the projection 9 in this manner, liquid can be accumulated in a wider range than the discharge port 15, so that the long member 40 easily comes into contact with the liquid pool 52, and it is possible to further prevent an uncoated portion. The projection 9 may protrude from the surface 6 of the recess 5 so as to extend upward in the vertical direction n, or may protrude from the surface 6 of the recess 5 so as to extend in a normal direction of the surface 6. A surface of the projection 9 may function as the support surface 3 of the long member 40. In this case, a surface of the projection 9 may have a shape conforming to an outer surface shape of the long member 40.

In FIG. 1, the coating device 1 includes a liquid supply unit 21 connected to the discharge port 15. The liquid supply unit 21 includes a storage part 22 that stores the coating liquid 50 and a supply pipe 23 connected to the storage part 22. The storage part 22 and the supply pipe 23 may be connected to a pump 24. The pump 24 is connected to the control unit 35 and supplies a predetermined amount of the liquid 50 to the supply pipe 23 side. Examples of the pump 24 include a syringe pump and a tube pump. In FIG. 2, an internal flow path 8 is provided inside the support part 2 and below the discharge port 15. A first end side of the internal flow path 8 communicates with the discharge port 15, and a second end side of the internal flow path 8 is connected to the supply pipe 23. In FIG. 5, the supply pipe 23 is disposed above the support part 2, a first end side of the supply pipe 23 communicates with the discharge port 15, and a second end side of the supply pipe 23 is connected to the storage part 22.

An inner diameter of the internal flow path 8 and an inner diameter of the supply pipe 23 is not particularly limited, but can be set to, for example, 0.1 mm or more and 3.0 mm or less.

As illustrated in FIGS. 1 and 5, the coating device 1 may include a recovery part 30 for recovering residual liquid 51 that does not adhere to the long member 40. The recovery part 30 may be a groove of a container such as a saucer or a tray, a tank, a pit, or the like that can receive the residual liquid 51. The recovery part 30 preferably has a wall for temporarily storing the residual liquid 51.

The recovery part 30 is disposed below the discharge port 15. The recovery part 30 may move along with movement in the longitudinal axis direction u of the discharge port 15. In this case, the recovery part 30 is preferably also connected to the drive mechanism 10.

The recovery part 30 preferably communicates with the discharge port 15. With this configuration, liquid recovered by the recovery part 30 can be reused by being transferred to the discharge port 15 side.

The recovery part 30 may have a discharge part 31 from which residual liquid recovered by the recovery part 30 is discharged. A configuration of the discharge part 31 is not particularly limited, but may be an openable and closable opening formed on a bottom or a side of the recovery part 30. In order to transfer residual liquid recovered by the recovery part 30 to the liquid supply unit 21, the discharge part 31 may be connected to the liquid supply unit 21. The discharge part 31 can be connected to the liquid supply unit 21 via a pipe or a pump.

The recovery part 30 is preferably connected to a liquid adjustment unit 32, and the recovery part 30 is more preferably connected to the liquid adjustment unit 32 via the discharge part 31. The residual liquid 51 is preferably transferred to the liquid supply unit 21 after a parameter such as concentration is adjusted by the liquid adjustment unit 32.

The discharge port 15 is preferably movable in the longitudinal axis direction u of the long member 40. By the above, coating can be performed along the longitudinal axis direction u of the long member 40. The discharge port 15 may move from the first end 41 side toward the second end 42 side of the long member 40 as indicated by an arrow A in FIG. 1. Further, although not indicated by an arrow, the discharge port 15 may move from the second end 42 side toward the first end 41 side.

The discharge port 15 may be movable in the radial direction of the long member 40. The discharge port 15 is easily moved along a shape of the long member 40, and a coating film thickness is easily made uniform.

As can be understood from FIGS. 1 to 2, the discharge port 15 is preferably movable together with the support part 2. As the discharge port 15 follows movement of the support part 2, liquid is easily discharged to the long member 40 while movement of the long member 40 is restricted by the support part 2.

In a case where the discharge port 15 is provided in a member different from the support part 2 as illustrated in FIGS. 5 to 6, the supply pipe 23 communicating with the discharge port 15 may be connected to the drive mechanism 10 to which the support part 2 is connected or a second drive mechanism (not illustrated) different from the drive mechanism 10. In this case, the discharge port 15 may be movable separately from the support part 2.

The coating device 1 may further include a first holding part 25 that holds the first end 41 side in the longitudinal axis direction u of the long member 40 and a second holding part 26 that holds the second end 42 side in the longitudinal axis direction u of the long member 40. With this configuration, since the long member 40 is stably held during coating, positional displacement of the long member 40 with respect to the discharge port 15 can be prevented.

The first holding part 25 and the second holding part 26 only need to have a mechanism capable of holding and releasing the long member 40 or a core material 28 to be described later, and can hold the long member 40 or the core material 28 by, for example, a method of pinching, sandwiching, gripping, sucking, fitting, or the like. The first holding part 25 or the second holding part 26 can include one or a plurality of members. The first holding part 25 and the second holding part 26 may have chuck pieces facing each other in the horizontal direction m or the vertical direction n. In FIG. 1, the first holding part 25 has chuck pieces 251 and 252, and the second holding part 26 has chuck pieces 261 and 262.

At least one of the first holding part 25 and the second holding part 26 preferably has a rotation mechanism 27 that rotates the long member 40. With this configuration, since coating can be applied while the long member 40 is rotated, liquid can be easily applied uniformly in a circumferential direction of the long member 40. Note that, although FIG. 1 illustrates an example in which the second holding part 26 has the rotation mechanism 27, the first holding part 25 may have the rotation mechanism 27, and the first holding part 25 and the second holding part 26 may each have the rotation mechanism 27.

The rotation mechanism 27 may revolve the long member 40 around the axis x of the coating device 1, or may rotate the long member 40 about an axial center of its longitudinal axis. Note that a direction of the axis x of the coating device 1 may be parallel to the horizontal direction m. A direction of the axis x may be a direction from the first holding part 25 toward the second holding part 26. The direction of the axis x may be parallel to the longitudinal axis direction u of the long member 40. The direction of the axis x may be a longitudinal axis direction of the core material 28 before the long member 40 revolves. The rotation mechanism 27 includes an actuator such as a motor that drives the first holding part 25 or the second holding part 26. For a configuration of the actuator, reference can be made to description of the drive mechanism 10.

The first holding part 25 and the second holding part 26 may directly hold the long member 40 or may indirectly hold the long member 40 via another member. In FIG. 1, the first holding part 25 directly holds an end portion on the first end 41 side of the long member 40, and the second holding part 26 directly holds an end portion on the second end 42 side of the long member 40. Since liquid is not applied to a first held part 47 held by the first holding part 25 in the long member 40 and a second held part 48 held by the second holding part 26 in the long member 40, the first and second held parts 47 and 48 may be removed after completion of application.

In FIG. 5, the long member 40 has a lumen extending in its longitudinal axis direction, and the coating device 1 further has the long core material 28 disposed in the lumen of the long member 40. The core material 28 has a first end 281 and a second end 282 in its longitudinal axis direction. The core material 28 passes through the lumen of the long member 40, the first end 281 side of the core material 28 extends from the first end 41 of the long member 40, and the second end 282 side of the core material 28 extends from the second end 42 of the long member 40. The first holding part 25 holds an end portion on the first end 281 side of the core material 28, and the second holding part 26 holds an end portion on the second end 282 side of the core material 28. As the long member 40 is held via the core material 28 in this manner, coating of the entire long member 40 in the longitudinal axis direction u is made possible. Further, since the long member 40 is not directly held, it is possible to prevent a surface of the long member 40 from being scratched.

The core material 28 is a long rod-like member. The core material 28 may be solid or hollow. As a material constituting the core material 28, description of a material constituting the long member 40 can be referred to.

The coating device 1 preferably includes the control unit 35 that controls operation of each part constituting the coating device 1. Specifically, the control unit 35 is connected to at least one of the liquid supply unit 21, the rotation mechanism 27 included in at least one of the first holding part 25 and the second holding part 26, the drive mechanism 10 that drives the support part 2, the recovery part 30, the discharge part 31, and the liquid adjustment unit 32. Note that unlike FIG. 1, connection of the recovery part 30 and the liquid adjustment unit 32 to the control unit 35 is omitted in FIG. 5.

A function of the control unit 35 may be realized by hardware or software. Examples of the hardware include a logic circuit formed in an integrated circuit.

The coating device 1 may include a computer that executes a command of a program that is software for realizing a function of the control unit 35. The computer preferably includes a processor, and a computer-readable storage medium storing the program. The function can be implemented when the processor executes the program stored in the computer-readable storage medium. Examples of the processor include a central processing unit (CPU). Examples of the storage medium include a read only memory (ROM). The storage medium can also include a random access memory (RAM). The program may be supplied to the computer via an appropriate transmission medium configured to transmit the program. Examples of the transmission medium include a communication network and a communication line.

The coating device 1 may be provided with an element for restricting movement of the long member 40 in a direction other than a downward direction of the vertical direction n. For example, as illustrated in FIGS. 10 to 12, the coating device 1 preferably further includes a pressing part 11 that presses the long member 40 from above. With the pressing part 11, since the long member 40 can be pressed by the pressing part 11 from a direction different from the support part 2, movement of the long member 40 is easily restricted.

The pressing part 11 is a portion that comes into contact with the long member 40. The pressing part 11 may be in point contact, line contact, or surface contact with the long member 40. The pressing part 11 may be attached to a member different from the support part 2 as illustrated in FIG. 10, or may be provided on the support part 2 as illustrated in FIGS. 11 to 12.

The pressing part 11 may extend in the longitudinal axis direction u of the long member 40 or may extend in a direction perpendicular to the longitudinal axis direction u. Further, the pressing part 11 may extend in a circumferential direction of the long member 40.

In the pressing part 11, the long member 40 may be pressed using drive of a motor connected to the pressing part 11, or the long member 40 may be pressed by its own weight. Further, by forming the pressing part 11 from an elastic body such as a spring or rubber, the long member 40 may be pressed by the pressing part 11 using a biasing force of the elastic body.

As the material constituting the pressing part 11, description of a material constituting the long member 40 can be referred to. In order to make sliding with respect to the long member 40 excellent, the pressing part 11 is preferably made from metal such as stainless steel such as SUS304 or SUS316. Further, in order to prevent the long member 40 from being scratched, the pressing part 11 may be made from rubber or elastomer. Constituent materials of the pressing part 11 and constituent materials of the support part 2 may be the same or different from each other.

In a case where the support part 2 is movable in the longitudinal axis direction u of the long member 40, the pressing part 11 is preferably disposed further on a side A to which the support part 2 advances than the discharge port 15 in the longitudinal axis direction u. By disposing the pressing part 11 in this manner, an uncoated portion of the long member 40 can be pressed by the pressing part 11. Since the pressing part 11 is less likely to come into contact with a coating portion of the long member 40, it is possible to enhance an effect of preventing peeling of coating and the uniformity of a coating film thickness.

The pressing part 11 is preferably movable in the longitudinal axis direction u of the long member 40. Further, the pressing part 11 is preferably movable in the radial direction of the long member 40. Furthermore, the pressing part 11 is preferably movable in the vertical direction n. It is easy to move the pressing part 11 along a shape of the long member 40. In FIG. 10, since the pressing part 11 is located at a lowermost position, it is indicated that the pressing part 11 is movable in an upward direction B. However, the pressing part 11 may be movable in a downward direction.

The pressing part 11 is preferably movable together with the support part 2. As the pressing part 11 follows movement of the support part 2, movement of the long member 40 can be more easily restricted. Further, the pressing part 11 is preferably movable together with the discharge port 15. As the pressing part 11 follows movement of the discharge port 15, liquid can be easily discharged to the long member 40 while movement of the long member 40 is restricted by the pressing part 11.

In a case where the support part 2 is movable in the longitudinal axis direction u of the long member 40, as illustrated in FIG. 10, the coating device 1 preferably further includes an attachment part 12 which is connected to the support part 2, extends to the side A to which the support part 2 advances, and attaches the pressing part 11 to the support part 2. The pressing part 11 can be attached to the support part 2 via the attachment part 12. Further, since the attachment part 12 extends to the side A to which the support part 2 advances, an uncoated portion of the long member 40 is easily pressed by the pressing part 11.

The attachment part 12 only needs to have a shape extending from the support part 2 to the side to which the support part 2 advances, and may have, for example, a plate shape, a block shape, or an arm shape. The attachment part 12 may be attached to the pressing part 11 or the support part 2 by a method such as crimping, adhesion, engagement, or fitting.

The attachment part 12 is preferably not in contact with the long member 40. An attachment position of the attachment part 12 with respect to the support part 2 is not particularly limited, but the attachment part 12 is preferably disposed on an upper portion of the support part 2 in order to prevent contact with the long member 40.

As illustrated in FIG. 10, the coating device 1 may further include a shaft 13 extending in the vertical direction n, and the pressing part 11 may be disposed at a lower end portion of the shaft 13. In that case, the shaft 13 is preferably movable in the vertical direction n. As the shaft 13 moves in the vertical direction n with respect to the support part 2, the pressing part 11 can be easily moved along a shape of the long member 40.

One or a plurality of the shafts 13 may be disposed. For example, two of the shafts 13 may be arranged in a direction perpendicular to the longitudinal axis direction u of the long member 40, and the pressing part 11 may extend in a direction perpendicular to the longitudinal axis direction u so as to connect lower end portions of two of the shafts 13.

In a case where the coating device 1 further includes the shaft 13 extending in the vertical direction n and the pressing part 11 is disposed at a lower end portion of the shaft 13, the attachment part 12 preferably has a through hole 121 penetrating in the vertical direction n and the shaft 13 is preferably inserted into the through hole 121. Since the shaft 13 is easily held by the attachment part 12, movement of the pressing part 11 can be stably performed.

The through hole 121 is preferably disposed in a portion extending further to the side A in an advancing direction than the support part 2 of the attachment part 12. This facilitates insertion of the shaft 13 into the through hole 121.

In order to prevent the shaft 13 from coming off the through hole 121, a large-diameter part 131 having an outer diameter larger than that of the through hole 121 may be disposed at an upper end portion of the shaft 13.

As illustrated in FIGS. 11 to 12, in a case where the support part 2 has the recess 5 on an upper surface, the pressing part 11 is preferably a protrusion 14 provided on the surface 6 of the recess 5. Since a width in the recess 5 can also be narrowed by providing the protrusion 14 in this manner, movement of the long member 40 during coating can be restricted by the support part 2 and the protrusion 14.

Only one of the protrusion 14 may be provided with respect to the support part 2, or a plurality of the protrusions 14 may be provided. In FIGS. 11 to 12, two of the protrusions 14 are provided. When a plurality of the protrusions 14 is arranged on the support part 2, protruding directions of a plurality of the protrusions 14 may be the same or different from each other.

The protrusion 14 may have a smaller width toward its tip, or may have the same width toward its tip.

A plurality of the protrusions 14 is preferably arranged such that their tips face each other. By making a plurality of the protrusions 14 face each other, a width in the recess 5 is easily narrowed, so that movement of the long member 40 is easily restricted.

In a case where two of the protrusions 14 face each other, a distance between tips of the protrusions 14 is preferably smaller than a maximum outer diameter of the long member 40. Movement of the long member 40 is easily restricted by the protrusion 14.

A protruding direction of the protrusion 14 is not particularly limited, but as illustrated in FIGS. 11 to 12, the protrusion 14 preferably protrudes from the surface 6 of the recess 5 so as to extend in the horizontal direction m or a normal direction of the surface 6 of the recess 5. With this configuration, the long member 40 moved during coating easily abuts on the protrusion 14, and the movement of the long member 40 is easily restricted.

The protrusion 14 may be a part of the recess 5 of the support part 2, or may be configured by an element different from the support part 2.

The protrusion 14 may be configured to be able to protrude and recessed from the surface 6 of the recess 5. By the above, the protrusion 14 can be protruded from the surface 6 of the recess 5 during coating to restrict movement of the long member 40, and the protrusion 14 can be accommodated in the support part 2 before and after coating, so that the long member 40 can be easily set and taken out.

The protrusion 14 only needs to be provided at an upper location than a lowest point of the inner bottom surface 7 of the recess 5 and below an uppermost point of the support part 2. The protrusion 14 is preferably provided on the upper side when a region from an uppermost point to a lowermost point of the surface 6 of the recess 5 is equally divided into two in the vertical direction n.

When a portion having a maximum outer diameter of the long member 40 is supported by the support part 2, a lower end of the protrusion 14 is preferably disposed above an upper end of the long member 40.

The protrusion 14 may be provided on the surface 6 of the recess 5 of the support part 2, and the pressing part 11 that presses the long member 40 may be provided further on the side A to which the support part 2 advances than the protrusion 14.

This application claims the benefit of the priority date of Japanese patent application No. 2021-051391 filed on Mar. 25, 2021. All of the contents of the Japanese patent application No. 2021-051391 filed on Mar. 25, 2021 are incorporated by reference herein.

REFERENCE SIGNS LIST

1: Coating device
2: Support part
3: Support surface
5: Recess
6: Surface
7: Inner bottom surface
8: Internal flow path
9: Projection
10: Drive mechanism
11: Pressing part
12: Attachment part
13: Shaft
14: Protrusion
15: Discharge port
20: Liquid pool part
21: Liquid supply unit
22: Storage part
23: Supply pipe
24: Pump
25: First holding part
26: Second holding part
27: Rotation mechanism
28: Core material
30: Recovery part
31: Discharge part
32: Liquid adjustment unit
35: Control unit
40: Long member
41: First end
42: Second end
50: Liquid
51: Residual liquid
52: Liquid pool
u: Longitudinal axis direction
m: Horizontal direction
n: Vertical direction

The invention claimed is:

1. A coating device for coating a long member for medical use, the coating device comprising:

a support part capable of supporting the long member for medical use; and a discharge port which is provided in the support part or disposed at a higher location than the support part and from which liquid to be applied to the long member is discharged, wherein the support part has a recess at an upper surface, and the discharge port is provided at a surface of the recess.

2. The coating device according to claim 1, wherein the discharge port is provided at a position including a lowermost point of an inner bottom surface of the recess.

3. The coating device according to claim 1, wherein the support part and the discharge port are configured so that the liquid is discharged upward from the discharge port.

4. The coating device according to claim 1, wherein the support part has a liquid pool part which is disposed around the discharge port so that the liquid discharged from the discharge port is accumulated at the liquid pool part.

5. The coating device according to claim 1, further comprising a pressing part that presses the long member downwardly.

6. The coating device according to claim 5, wherein the support part is configured to be movable in a longitudinal axis direction of the long member so as to apply the liquid, which is supplied from the discharge port, to the long member, and the pressing part is disposed forward of the discharge port in a direction in which the support part advances in the longitudinal axis direction, and the pressing part presses the long member toward the support part.

7. The coating device according to claim 5, wherein the pressing part is configured to be movable in a vertical direction to press the long member.

8. The coating device according to claim 5, wherein the support part is configured to be movable in a longitudinal axis direction of the long member, and the coating device further comprises:

an attachment part that is connected to the support part, extends toward the side to which the support part advances, and attaches the pressing part to the support part.

9. The coating device according to claim 5, further comprising:

a shaft extending in a vertical direction, wherein the pressing part is disposed at a lower end portion of the shaft.

10. The coating device according to claim 8, further comprising:

a shaft extending in a vertical direction, wherein the pressing part is disposed at the lower end portion of the shaft;

the attachment part has a through hole penetrating in the vertical direction; and the shaft is inserted into the through hole so that the shaft is movable in the vertical direction.

11. The coating device according to claim 5, wherein the pressing part comprises a protrusion disposed on a surface of the recess.

12. The coating device according to claim 11, wherein the protrusion protrudes from the surface of the recess so as to extend in a horizontal direction or a direction perpendicular to the surface of the recess from which the protrusion protrudes.

13. The coating device according to claim 1, wherein the discharge port is configured to be movable in a longitudinal axis direction of the long member so as to apply the liquid to the long member.

14. The coating device according to claim 1, wherein the discharge port is configured to be movable in a radial direction of the long member so as to apply the liquid to the long member.

15. The coating device according to claim 1, wherein the discharge port is configured to be movable together with the support part.

16. The coating device according to claim 1, wherein a plurality of the support parts is included, and the discharge port is provided in each of the plurality of the support parts.

17. The coating device according to claim 1, further comprising:

a first holding part that holds a first end side in a longitudinal axis direction of the long member; and a second holding part that holds a second end side in the longitudinal axis direction of the long member, wherein at least one of the first holding part and the second holding part has a rotation mechanism that rotates the long member.

18. The coating device according to claim 1, wherein the long member is a member for forming a catheter.

19. A coating device for coating a long member for medical use, the coating device comprising:

a support part capable of supporting the long member for medical use;

a discharge port which is provided in the support part or disposed at a higher location than the support part and from which liquid to be applied to the long member is discharged; and a pressing part that presses the long member downwardly, wherein the support part has a recess at an upper surface, and the pressing part comprises a protrusion disposed on a surface of the recess.

* * * * *